United States Patent
Takeo et al.

(10) Patent No.: US 7,242,795 B2
(45) Date of Patent: Jul. 10, 2007

(54) PROSPECTIVE ABNORMAL SHADOW DETECTING SYSTEM

(75) Inventors: Hideya Takeo, Kaisei-machi (JP); Takashi Imamura, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 613 days.

(21) Appl. No.: 10/166,744

(22) Filed: Jun. 12, 2002

(65) Prior Publication Data
US 2002/0196967 A1    Dec. 26, 2002

(30) Foreign Application Priority Data
Jun. 13, 2001   (JP) ............................ 2001-178151

(51) Int. Cl.
*G06K 9/00* (2006.01)
(52) U.S. Cl. .................. 382/132; 378/37; 358/3.17; 600/437
(58) Field of Classification Search ........ 382/100, 382/128, 132, 190, 199; 358/3.17; 378/37; 257/E21.058, E21.067, E29.012, E29.013; 600/437
See application file for complete search history.

(56) References Cited

U.S. PATENT DOCUMENTS

| | | | |
|---|---|---|---|
| 4,338,948 A * | 7/1982 | Perez-Mendez et al. .... | 600/437 |
| 5,506,913 A * | 4/1996 | Ibison et al. ................. | 382/132 |
| 5,537,485 A * | 7/1996 | Nishikawa et al. .......... | 382/130 |
| 5,627,907 A * | 5/1997 | Gur et al. .................... | 382/132 |
| 5,732,697 A * | 3/1998 | Zhang et al. ................. | 600/300 |
| 5,761,334 A | 6/1998 | Nakajima et al. | |
| 5,896,463 A * | 4/1999 | Kuhn .......................... | 382/133 |
| 6,058,322 A | 5/2000 | Nishikawa et al. | |
| 6,246,782 B1 * | 6/2001 | Shapiro et al. .............. | 382/128 |
| 6,542,771 B2 * | 4/2003 | Saotome et al. ............. | 600/425 |
| 6,563,945 B2 * | 5/2003 | Holm .......................... | 382/162 |
| 6,748,099 B1 * | 6/2004 | Kawata ....................... | 382/132 |
| 6,934,409 B2 * | 8/2005 | Ohara ......................... | 382/132 |

FOREIGN PATENT DOCUMENTS

| | | |
|---|---|---|
| JP | 8-287230 | 11/1996 |
| JP | 8-294479 | 11/1996 |

OTHER PUBLICATIONS

Journal of Academy of Electronics/Information/Communication D-II, vol. J75-D-11 No. 7, pp. 1170-1176, Jul. 1992.
Medical Imaging Technology, vol. 12, No. 1, Jan. 1994.

(Continued)

*Primary Examiner*—Sheela Chawan
(74) *Attorney, Agent, or Firm*—Sughrue Mion, PLLC

(57) ABSTRACT

Prospective micro calcification points in a radiation image of an object are extracted on the basis of image data representing the radiation image and clustered into cluster areas. A plurality of areas are set in the radiation image, and fluctuation in size and/or fluctuation in density of the prospective micro calcification points in each of the areas is obtained. Detected areas are extracted from the plurality of areas on the basis of the fluctuation in size and/or the fluctuation in density of the prospective micro calcification points in each of the areas, and each interconnected area where a predetermined number of or more extracted detected areas are continuous is set as a cluster area.

19 Claims, 5 Drawing Sheets

OTHER PUBLICATIONS

Yu S et al., "Automatic Detection of Clustered Microcalcifications in Digitized Mammogram Films", Journal of Electronic Imaging, SPIE + IS&T, US, vol. 8, No. 1, Jan. 1999, pp. 76-82, XP000801641.

Yu S. et al; Automatic detection of clustered microcalcifications in digitized mammogram films; Journal of Electronic Imaging, SPIE + IS&T; US, (Jan. 1999); 8(1), pp. 76-82.

* cited by examiner

PROSPECTIVE ABNORMAL SHADOW DETECTING SYSTEM

BACKGROUND OF THE INVENTION

1. Field of the Invention

This invention relates to a prospective abnormal shadow detecting system for detecting a prospective abnormal shadow in a radiation image, and more particularly to a prospective abnormal shadow detecting system for detecting a micro calcification area, in which a prospective shadow of micro calcification exists, on the basis of radiation image data of an object and to a prospective abnormal shadow detecting system for detecting a benignant micro calcification area, in which a prospective shadow of benignant micro calcification exists, and a malignant micro calcification area, in which a prospective shadow of malignant micro calcification exists, separately from each other on the basis of radiation image data of an object.

2. Description of the Related Art

In the medical field, to find a diseased part of a patient or to observe a diseased part of a patient and diagnose progress of disease by reading a radiation image of the object (patient) has been a common operation. However, radiation image reading often depends upon experience and abilities of the reader and is not necessarily objective.

For example, it is necessary to find an abnormal shadow representing a growth and/or a micro calcification representative of a cancerous part in a mammogram (a radiation image of a breast) taken for the purpose of a breast cancer examination. However, depending on the reader, the abnormal shadow area cannot be properly designated. Accordingly, there has been a demand to properly detect an abnormal shadow including shadows of a growth and a micro calcification.

In order to meet this demand, a prospective abnormal shadow detecting system (a computer-aided image diagnosis system), has been proposed, as disclosed, for instance, in Japanese Unexamined Patent Publication Nos. 8(1996)-294479 and 8(1996)-287230 in which a prospective abnormal shadow is automatically detected by the use of a computer on the basis of image data representing a radiation image of the object. In the prospective abnormal shadow detecting system, a prospective abnormal shadow is automatically detected on the basis of density distribution and/or configurational feature by the use of an iris filter processing which is mainly suitable for detecting a growth shadow or a morphology filter processing which is mainly suitable for detecting a prospective micro calcification shadow.

The morphology filter processing is a method effective to detect a shadow of prospective micro calcification (comprising a plurality of small calcified areas), which is a specific form of breast cancer, by comparing a predetermined threshold value with the output value of a morphology operation using a structural element which is larger in size than micro calcification to be detected. The morphology filter processing will be described in detail, hereinbelow.

The morphology filter is a filter which can remove from an image noises and/or shadows which are smaller in size than a structural element employed and is generally used for smoothening an image signal, extraction of a shadow of prospective micro calcification, and the like.

(The Fundamentals of Morphology Operation)

Though the morphology operation is generally developed as a set theory in a N-dimensional space, it will be discussed here on the basis of a two-dimensional tone image for the purpose of simplicity of understanding.

It is assumed that a tone image is a space in which a point (x, y) has a height corresponding to a value of density f(x, y). Further it is assumed that the value of density f(x, y) is represented by a high brightness, high level signal in which as the value of density decreases (the value of brightness increases when displayed on a CRT), the level of the signal becomes higher.

For the purpose of simplicity, a linear function f(x) corresponding to a cross-section of the image is first discussed. It is assumed that a structural element g employed in the morphology operation is a function which is represented by the following formula (1), is symmetrical about the origin, and is 0 in value in a domain represented by the following formula (2).

$$g^s(x) = g(-x) \tag{1}$$

$$G = \{-m, -m+1, \ldots, -1, 0, 1, \ldots, m-1, m\} \tag{2}$$

At this time, the fundamental form of the morphology operation is very simple as shown in the following formulae (3) to (6).

$$\text{dilation: } [f \oplus G^s](i) = \max\{f(i-m), \ldots, f(i), \ldots, f(i+m)\} \tag{3}$$

$$\text{erosion: } [f \ominus G^s](i) = \min\{f(i-m), \ldots, f(i), \ldots, f(i+m)\} \tag{4}$$

$$\text{opening: } f_g = (f \ominus g^s) \oplus g \tag{5}$$

$$\text{closing: } f^g = (f \oplus g^s) \ominus g \tag{6}$$

That is, the dilation processing is processing for searching a maximum value in the area whose width is ±m (a value determined according to the structural element B) and whose center is at the pixel of current interest, see FIG. 4A, and the erosion processing is processing for searching a minimum value in the same area, see FIG. 4B. The opening processing corresponds to searching a maximum value after searching a minimum value, and the closing processing corresponds to searching a minimum value after searching a maximum value. In other words, the opening processing corresponds to smoothening the density curve f(x) from the low brightness side and removing protrusions in density (the portions which are higher in brightness than the surroundings) which are narrower than the mask size 2 m (see FIG. 4C), whereas the closing processing corresponds to smoothening the density curve f(x) from the high brightness side and removing recesses in density (the portions which are lower in brightness than the surroundings) which are narrower than the mask size 2 m (see FIG. 4D).

In the case of a high density, high level signal in which as the value of density increases, the level of the signal becomes higher, the value of image signal for the value of density f(x) is reverse to that of a high brightness, high level signal. Accordingly, the dilation processing for a high density, high level signal corresponds to the erosion processing for a high brightness, high level signal. Similarly, the erosion processing for a high density, high level signal corresponds to the dilation processing for a high brightness, high level signal, the opening processing for a high density, high level signal corresponds to the closing processing for a high brightness, high level signal, and the closing processing for a high density, high level signal corresponds to the opening processing for a high brightness, high level signal. Description will be made only on the high brightness, high level signal here.

(Application to Detection of a Micro Calcification Shadow)

As a method of detecting a micro calcification shadow, a subtraction method in which a smoothened image is subtracted from an original image is conceivable. Since it is difficult to distinguish a calcification shadow from an elongated non-calcification shadow (e.g., of a mammary gland, a blood vessel, and a mammary gland supporting tissue) by a simple smoothening method, morphology operation processing based on opening operation using multiple structural elements as represented by the following formula (7) has been proposed. See "Extraction of Microcalcifications on Mammogram Using Morphological Filter with Multiple Structuring Elements" (Journal of Academy of Electronics/Information/Communication D-II, vol. J75-D-II No. 7, pp. 1170 to 1176, July 1992) and "Basic Theory of Mathematical Morphology and its Application to Mammograms Processing" (MEDICAL IMAGING TECHNOLOGY, Vol. 12, No. 1 January 1994).

$$P = f - \max_{i \in (1,\cdots,M)} \{(f \ominus Bi) \oplus Bi\} \quad (7)$$
$$= f - \max_{i \in (1,\cdots,M)} \{f_{Bi}\}$$

wherein Bi (i stands for 1, 2, 3 and 4) are four linear structural elements B shown in FIG. 5. When the structural elements B are larger than calcification shadows to be detected, calcification shadows which are protrusions in the image signal narrower than the structural elements B (a part of the image the image signal of which fluctuates in a range spatially narrower than the structural elements B) are removed by opening processing. On the other hand, an elongated non-calcification shadow is left there as it is after the opening processing (calculation of the second term in formula 7) so long as it is longer than the structural elements B and its inclination (the direction in which the shadow extends) conforms to any one of the four structural elements $B_i$. Accordingly, by subtracting the smoothened image (the image removed with the calcification shadow) obtained by the opening processing from the original image f, an image containing therein only a small prospective calcification shadow is obtained. This the concept of formula (7).

In the case of a high density, high level signal, closing processing is applied according to the following formula (8) in place of the opening processing represented by formula (7).

$$P = f - \min_{i \in (1,\cdots,M)} \{(f \oplus Bi) \ominus Bi\} \quad (8)$$
$$= f - \min_{i \in (1,\cdots,M)} \{f_{Bi}\}$$

However, a non-calcification shadow equivalent to a calcification shadow in size can still remain. In such a case, non-calcification shadows contained in P represented by formula (7) are further removed by the use of differential information based on a morphology operation according to the following formula (9).

$$M_{grad} = (1/2) \times \{f \oplus \lambda B - f \ominus \lambda B\} \quad (9)$$

As the value of $M_{grad}$ increases, the probability that the shadow is of a micro calcification increases. Accordingly, a prospective micro calcification shadow $C_s$ can be obtained according to the following formula (10).

If $P(i, j) \geq T1$, and $M_{grad}(i, j) \geq T2$

Then, $C_s(i, j) = P$ else $C_s(i, j) = 0$ $\quad (10)$

T1 and T2 are empirically determined threshold values.

Since a non-calcification shadow different from a calcification shadow in size can be removed only by comparison of P obtained according to formula (7) and the threshold value T1, only the condition of the first term of formula (10), $P(i, j) \geq T1$ has to be satisfied in the case where there is no possibility that a non-calcification shadow equivalent to a calcification shadow in size remains.

Finally, the cluster area Cc of the micro calcification shadow (the area in which the micro calcification exists) is detected by a combination of a multi-scale opening operation and closing operation represented by the following formula (11).

$$C_c = C_s \oplus \lambda_1 B \ominus \lambda_3 B \oplus \lambda_2 B \quad (11)$$

wherein $\lambda_1$ and $\lambda_2$ are respectively determined by the maximum distance between calcification shadows to be fused and the maximum radius of an isolated shadow to be removed, and $\lambda_3 = \lambda_1 + \lambda_2$.

Though the morphology operation processing has been described in conjunction with a high brightness, high level signal, the relation between the opening processing and the closing processing is reversed in the case of a high density, high level signal in which a pixel of a higher density has a larger digital value.

It is necessary to set larger the threshold values T1 and T2 in order to surely remove non-calcification shadows smaller than micro calcification shadows from the image Cs including therein a prospective micro calcification shadow. However when the threshold values T1 and T2 are set larger, there arises fear that a thin prospective micro calcification shadow (a shadow of micro calcification low in density) can be regarded as of noise and removed. To the contrast, when the threshold values T1 and T2 are set smaller, the image obtained will include a lot of noise though a thin prospective micro calcification shadow can be extracted as a prospective micro calcification shadow, and accordingly, when a prospective micro calcification area is detected on the basis of such an image, there is fear that the detecting accuracy deteriorates.

Further, when the threshold values T1 and T2 are set large so that a prospective micro calcification image including substantially no non-calcification shadow like noise can be obtained and a prospective micro calcification area is detected on the basis of the prospective micro calcification image, it is preferred that attributes of the prospective micro calcification area (e.g., whether it is malignant or benignant) or other information useful for diagnosis be provided to the shadow reader together with the result of the detection in order to better aid in diagnosis.

SUMMARY OF THE INVENTION

In view of the foregoing observations and description, the primary object of the present invention is to provide a prospective abnormal shadow detecting system which is feasible to suppress deterioration of the detecting accuracy due to influence of a non-calcification shadow like noise when a prospective micro calcification area is detected on the basis of the prospective micro calcification image including therein a thin prospective micro calcification shadow.

Another object of the present invention is to provide a prospective abnormal shadow detecting system which is feasible, when detecting a prospective micro calcification area on the basis of a prospective micro calcification image including substantially no non-calcification shadow like noise, to recognize attributes of the prospective micro calcification area and to provide the attributes of the prospective micro calcification area recognized together with the result of the detection.

In accordance with a first aspect of the present invention, there is provided an abnormal shadow detecting system comprising a prospective micro calcification point extracting means which extracts prospective micro calcification points in a radiation image of an object on the basis of image data representing the radiation image, and a cluster area setting means which clusters the extracted prospective micro calcification points to set cluster areas, wherein the improvement comprises that the cluster area setting means sets a plurality of areas in the radiation image, obtains fluctuation in size and/or fluctuation in density of the prospective micro calcification points in each of the areas, extracts detected areas from the plurality of areas on the basis of the fluctuation in size and/or the fluctuation in density of the prospective micro calcification points in each of the areas, and sets each interconnected area where a predetermined number of or more extracted detected areas are continuous as a cluster area.

The abnormal shadow detecting system in accordance with the first aspect of the present invention is especially useful when the prospective micro calcification points extracted by the prospective micro calcification point extracting means include a thin prospective micro calcification shadow and/or a noise.

The "plurality of areas which the cluster area setting means sets in the radiation image" may be various areas. For example, they may be circular areas having their centers on the respective prospective micro calcification points, small areas set substantially over the entire area of the image of the object in the radiation image, or the like. It is preferred that the areas be of the same size though not necessary.

The "fluctuation in size and/or fluctuation in density of the prospective micro calcification points in each of the areas" can be obtained, for instance, by the use of various indexes such as deviation and dispersion representing fluctuation. The cluster area setting means extracts areas where the fluctuation in size and/or fluctuation in density of the prospective micro calcification points is large as the detected areas. For example, the cluster area setting means may be arranged to obtain the count of the prospective micro calcification points in each of the areas, correct the obtained count on the basis of the fluctuation in size and/or the fluctuation in density of the prospective micro calcification points in the area and extracts areas where the corrected count is not smaller than a predetermined threshold value as the detected areas.

The count may be corrected in various ways. For example, assuming that the areas are circular areas of a predetermined size having their centers respectively on the extracted prospective micro calcification points, a first predetermined value $V1$ is subtracted from the count of the prospective micro calcification points in a given area when the fluctuation in size of the prospective micro calcification points in the area is smaller than a first size threshold value $T1$ and at the same time when the fluctuation in density of the prospective micro calcification points in the area is smaller than a first density threshold value $T'1$, a second predetermined value $V2$ is subtracted from the count of the prospective micro calcification points in a given area when the fluctuation in size of the prospective micro calcification points in the area is between the first size threshold value $T1$ and a second size threshold value $T2$ and at the same time when the fluctuation in density of the prospective micro calcification points in the area is between the first density threshold value $T'1$ and a second density threshold value $T'2$, a third predetermined value $V3$ is added to the count of the prospective micro calcification points in a given area when the fluctuation in size of the prospective micro calcification points in the area is between a third size threshold value $T3$ and a fourth size threshold value $T4$ and at the same time when the fluctuation in density of the prospective micro calcification points in the area is between a third density threshold value $T'3$ and a fourth density threshold value $T'4$, and a fourth predetermined value $V4$ is added to the count of the prospective micro calcification points in a given area when the fluctuation in size of the prospective micro calcification points in the area is larger than a fourth size threshold value $T4$ and at the same time when the fluctuation in density of the prospective micro calcification points in the area is larger than a fourth density threshold value $T'4$. It is preferred that $T1<T2 \leq T3<T4$ with $T'1<T'2 \leq T'3<T'4$ and $V1=V4>V2=V3$. The number of the threshold values may be increased or decreased to correct the number in different steps, or the correction need not be discrete but may be continuous. Further the correction may be performed on the basis of only one of the fluctuation in size and the fluctuation in density.

Further it is possible to arrange the cluster area setting means to obtain the count of the prospective micro calcification points in each of the areas and to extract an area as the detected area when the count of the prospective micro calcification points in the area is not smaller than a predetermined threshold value which is determined area by area on the basis of the fluctuation in size and/or the fluctuation in density of the prospective micro calcification points in the area.

The "interconnected area where a predetermined number of or more extracted detected areas are continuous" should be interpreted as an area where at least the predetermined number of detected areas exist contiguously to each other or overlapping each other. The predetermined number may be a single. That is, the interconnected area may be formed by a single extracted detected area.

The prospective micro calcification point extracting means may extract prospective micro calcification points by, for instance, a method using the morphology filter.

In the abnormal shadow detecting system in accordance with the first aspect of the present invention, detected areas are extracted from the plurality of areas on the basis of the fluctuation in size and/or the fluctuation in density of the prospective micro calcification points in each of the areas, and each interconnected area where a predetermined number of or more extracted detected areas are continuous is set as a cluster area. Accordingly, deterioration in detecting accuracy due to influence of a non-calcification shadow like noise can be suppressed and the cluster areas of the micro calcification shadow (the areas in which the micro calcification exists) can be detected more accurately. That is, an attempt to extract even a thin micro calcification shadow generally results in extraction of more non-calcification shadows like noise. However, since there is a tendency for the non-calcification shadow to be generally stable in shape (e.g., size and/or density) as compared with the micro calcification shadow, the micro calcification shadow can be separated from the non-calcification shadow, whereby it becomes feasible to detect a thin micro calcification shadow, which has been difficult to detect, without deteriorating the accuracy in detection.

In accordance with a second aspect of the present invention, there is provided an abnormal shadow detecting system comprising a prospective micro calcification point extracting means which extracts prospective micro calcification points in a radiation image of an object on the basis of image data representing the radiation image, and a cluster area setting means which clusters the extracted prospective micro calcification points to set cluster areas, wherein the improvement comprises that the cluster area setting means sets a plurality of areas in the radiation image, obtains fluctuation in size and/or fluctuation in density of the prospective micro calcification points in each of the areas, extracts benignant detected areas and/or malignant detected area from the plurality of areas on the basis of the fluctuation in size and/or the fluctuation in density of the prospective micro calcification points in each of the areas, and sets each interconnected area where a predetermined number of or more benignant extracted detected areas are continuous as a benignant cluster area and/or each interconnected area where a predetermined number of or more malignant extracted detected areas are continuous as a malignant cluster area.

The abnormal shadow detecting system in accordance with the second aspect of the present invention is especially useful when the prospective micro calcification points extracted by the prospective micro calcification point extracting means include substantially no thin prospective micro calcification shadow and/or non-calcification shadow like noise.

The "plurality of areas which the cluster area setting means sets in the radiation image" may be various areas. For example, they may be circular areas having their centers on the respective prospective micro calcification points, small areas set substantially over the entire area of the image of the object in the radiation image, or the like. It is preferred that the areas be of the same size though not necessary.

The "fluctuation in size and/or fluctuation in density of the prospective micro calcification points in each of the areas" can be obtained, for instance, by the use of various indexes such as deviation and dispersion representing fluctuation. The cluster area setting means extracts areas where the fluctuation in size and/or fluctuation in density of the prospective micro calcification points is relatively large as the malignant detected areas and areas where the fluctuation in size and/or fluctuation in density of the prospective micro calcification points is relatively small as the benignant detected areas.

For example, the cluster area setting means may be arranged to obtain the count of the prospective micro calcification points in each of the areas, correct the obtained count on the basis of the fluctuation in size and/or the fluctuation in density of the prospective micro calcification points in the area and extract areas where the corrected count is not smaller than a first predetermined threshold value as the malignant detected areas and areas where the corrected count is smaller than a second predetermined threshold value as the malignant detected areas. It is preferred that the first predetermined threshold value be not smaller than the second predetermined threshold value. In the case where the first predetermined threshold value is larger than the second predetermined threshold value and the corrected count is between the first and second threshold values in a certain area, the area may be extracted as a benignant or malignant detected area.

Further it is possible to arrange the cluster area setting means to obtain the count of the prospective micro calcification points in each of the areas and to extract an area as the malignant detected area when the count of the prospective micro calcification points in the area is not smaller than a first predetermined threshold value which is determined area by area on the basis of the fluctuation in size and/or the fluctuation in density of the prospective micro calcification points in the area. Similarly, it is possible to arrange the cluster area setting means to obtain the count of the prospective micro calcification points in each of the areas and to extract an area as the benignant detected area when the count of the prospective micro calcification points in the area is smaller than a second predetermined threshold value which is determined area by area on the basis of the fluctuation in size and/or the fluctuation in density of the prospective micro calcification points in the area.

The cluster area setting means may set either only one of the benignant cluster area and the malignant cluster area or both the benignant cluster area and the malignant cluster area. Similarly the cluster area setting means may set either only one of the benignant detected area and the malignant detected area or both the benignant detected area and the malignant detected area.

The "interconnected area where a predetermined number of or more extracted detected areas are continuous" should be interpreted as an area where at least the predetermined number of detected areas exist contiguously to each other or overlapping each other. The predetermined number may be a single. That is, the interconnected area may be formed by a single extracted detected area.

The prospective micro calcification point extracting means may extract prospective micro calcification points by, for instance, a method using the morphology filter.

In the abnormal shadow detecting system in accordance with the second aspect of the present invention, benignant and/or malignant detected areas are extracted from the plurality of areas on the basis of the fluctuation in size and/or the fluctuation in density of the prospective micro calcification points in each of the areas, and each interconnected area where a predetermined number of or more benignant extracted detected areas are continuous is set as a benignant cluster area while each interconnected area where a predetermined number of or more malignant extracted detected areas are continuous is set as a malignant cluster area. Accordingly, the attributes of the prospective micro calcification area recognized can be provided together with the result of detection of a cluster area of micro calcification. That is, there has been known a fact that the benignant micro calcification shadow is generally stable in shape (e.g., size and/or density) as compared with the malignant micro calcification shadow. Especially when the shapes of the extracted prospective micro calcification points in an area are irregular, that is, when the extracted prospective micro calcification points in an area are various in size, shape and density, there is strong probability that the area include malignant micro calcification. Thus, the abnormal shadow detecting system in accordance with the present invention can better aid in diagnosis.

In accordance with a third aspect of the present invention, there is provided an abnormal shadow detecting system comprising a prospective micro calcification point extracting means which extracts prospective micro calcification points in a radiation image of an object on the basis of image data representing the radiation image, and a cluster area setting means which clusters the extracted prospective micro calcification points to set cluster areas, wherein the improvement comprises a malignancy discriminating means which obtains fluctuation in size and/or fluctuation in density of the prospective micro calcification points in each of the cluster areas and discriminate whether the cluster area is of malignant micro calcification or benignant micro calcification on the basis of the fluctuation in size and/or the fluctuation in density of the prospective micro calcification points in the area.

The cluster areas may be set in various ways. For example, circular areas each having a predetermined size are set with their centers positioned on the respective prospective micro calcification points having a size not smaller than a predetermined value, areas where the circular areas are continuous are extracted as interconnected areas and those having therein a predetermined number of or more of the circular areas are set as cluster areas out of the interconnected areas. Otherwise, a plurality of small areas of random shapes are set substantially over the entire area of the image of the object in the radiation image, those including therein prospective micro calcification points not smaller than a predetermined size in a predetermined number or more are selected from the small areas set, and areas having therein a predetermined number of or more of the selected small areas continuous to each other are set as cluster areas.

The "fluctuation in size and/or fluctuation in density of the prospective micro calcification points in each of the areas" can be obtained, for instance, by the use of various indexes such as deviation and dispersion representing fluctuation. The malignancy discriminating means regards cluster areas where the fluctuation in size and/or fluctuation in density of the prospective micro calcification points is relatively large as the malignant cluster areas and cluster areas where the fluctuation in size and/or fluctuation in density of the prospective micro calcification points is relatively small as the benignant cluster areas.

The prospective micro calcification point extracting means may extract prospective micro calcification points by, for instance, a method using the morphology filter.

In the abnormal shadow detecting system in accordance with the third aspect of the present invention, by virtue of the malignancy discriminating means, the attributes of the prospective micro calcification area (whether it is malignant or benignant) can be provided together with the result of detection of a cluster area of micro calcification.

DESCRIPTION OF THE PREFERRED EMBODIMENTS

Figure 1:
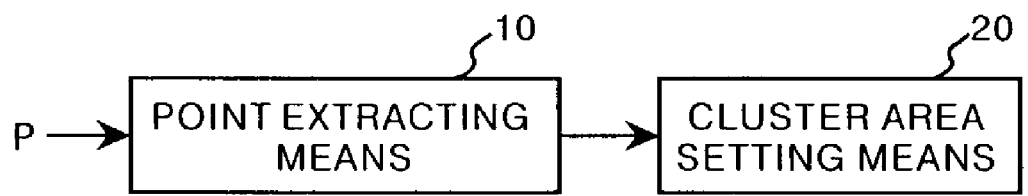
FIG. 1 is a view showing the structure of an abnormal shadow detecting system in accordance with an embodiment of the present invention.

In FIG. 1, an abnormal shadow detecting system in accordance with an embodiment of the present invention comprises a prospective micro calcification point extracting means 10 which extracts prospective micro calcification points in an original image on the basis of original image data P input, for instance, from an image read-out apparatus, and a cluster area setting means 20 which clusters the extracted prospective micro calcification points to set cluster areas (the areas in which the micro calcification exists).

When original image data P representing a radiation image of a breast is input into the prospective micro calcification point extracting means 10, the prospective micro calcification point extracting means 10 extracts prospective micro calcification points (prospective micro calcification shadows) in the radiation image by a morphology filter processing and creates a micro structure image (a prospective micro calcification image) Cs1 including therein only the prospective micro calcification points. At this time, the prospective micro calcification point extracting means 10 sets smaller the threshold values T1 and T2 in the morphology filter processing so that the micro structure image Cs1 includes a relatively lot of noise.

Image data representing the micro structure image Cs1 is input into the cluster area setting means 20. The cluster area setting means 20 sets a plurality of circular areas, each of which has its center on one of the extracted prospective micro calcification points and is 51 pixels (5.1 mm) in its radius, on the basis of the image data representing the micro structure image Cs1 and obtains the count (number) of the prospective micro calcification points included in each of the circular areas.

Figure 2:
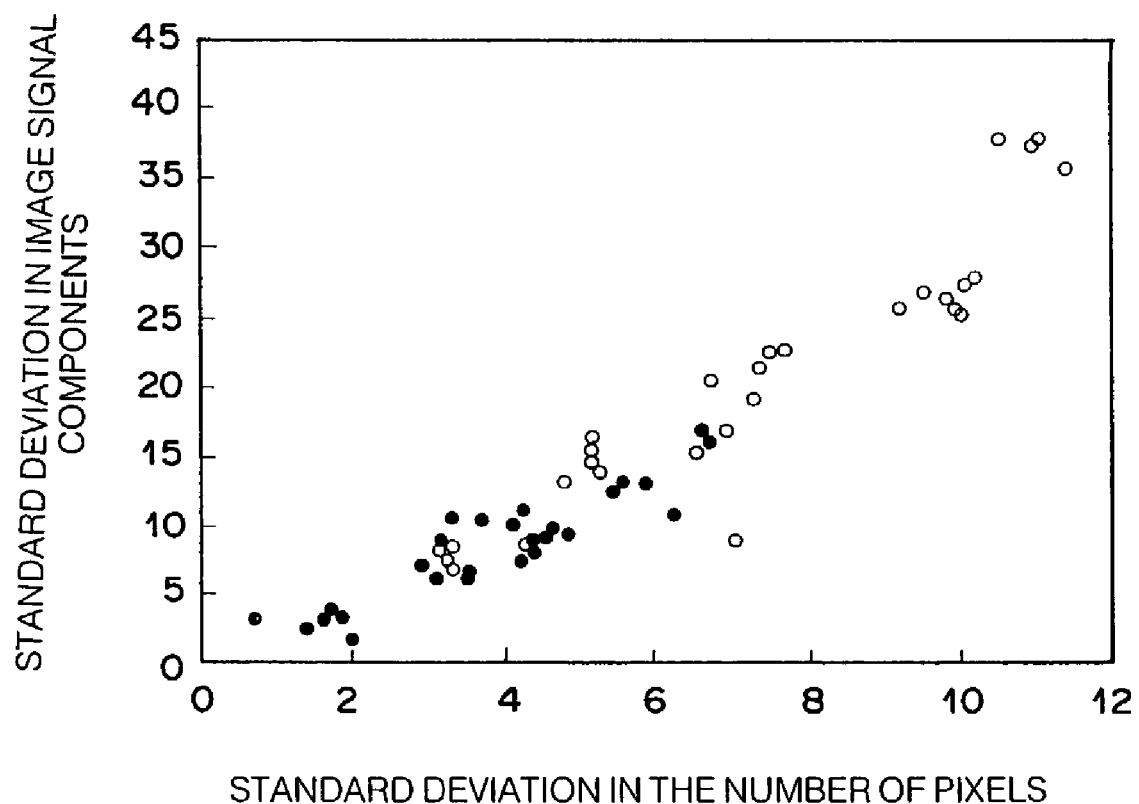
FIG. 2 is a view for illustrating fluctuation in size (standard deviation of the number of pixels) and density (standard deviation of the signal values for pixels) of prospective micro calcification points in a circular area.

Thereafter, the cluster area setting means 20 obtains fluctuation in size and fluctuation in density of the prospective micro calcification points included in each of the circular areas. FIG. 2 shows fluctuation in size (abscissa) of the prospective micro calcification points in a certain circular area and fluctuation in density (ordinate) of the prospective micro calcification points in the circular area with standard deviation employed as the index representing fluctuation. The abscissa in FIG. 2 shows the standard deviation in size of the prospective micro calcification points in terms of the number of pixels (10 pixels/mm) and the ordinate in FIG. 2 shows the standard deviation in density of the prospective micro calcification points in terms of the value of 10 bit image signal component which is increased to represent higher density. Noises represented by black dots gather at a lower left portion where deviation in size and deviation in density are both small whereas micro calcification shadows represented by white dots gather at an upper right portion where deviation in size and deviation in density are both large. The cluster area setting means 20 corrects the counts on the basis of this tendency.

More specifically, when the deviation in size of a prospective micro calcification point is in the range of 0.0 to smaller than 0.7, a count correction value of −2 is employed, when the deviation in size of a prospective micro calcification point is in the range of 0.7 to smaller than 2.0, a count correction value of −1 is employed, when the deviation in size of a prospective micro calcification point is in the range of 6.7 to smaller than 20.0, a count correction value of +1 is employed, and when the deviation in size of a prospective micro calcification point is not smaller than 20.0, a count correction value of +2 is employed. When the deviation in density of a prospective micro calcification point is in the range of 0.0 to smaller than 1.3, a count correction value of −2 is employed, when the deviation in density of a prospective micro calcification point is in the range of 1.3 to smaller than 4.0, a count correction value of −1 is employed, when the deviation in density of a prospective micro calcification point is in the range of 26.7 to smaller than 80.0, a count correction value of +1 is employed, and when the deviation in density of a prospective micro calcification point is not smaller than 80.0, a count correction value of +2 is employed. That is, each time one prospective micro calcification point is counted, a number ranging from −4 to +4 is added on the basis of the fluctuation in size and density of the point.

The cluster area setting means 20 extracts areas, where the corrected count is 5 or more, as detected areas, and sets each interconnected area where one or more extracted detected areas are continuous as a cluster area.

The threshold values and the correction values described above in conjunction with correction of the count of the prospective micro calcification points in each of the circular areas may be empirically determined and are shown only by way of example and may be variously determined according to the micro calcification shadows to be detected.

Otherwise, the count threshold value may be changed area by area according to the fluctuation in size and density of the prospective micro calcification points in the area. That is, it is possible to arrange the cluster area setting means 20 to obtain the count of the prospective micro calcification points in each of the circular areas, to obtain the fluctuation in size and/or the fluctuation in density of the prospective micro calcification points in the area, to set the count threshold value area by area on the basis of the fluctuation in size and/or the fluctuation in density of the prospective micro calcification points in the area and to extract an area as the detected area when the count of the prospective micro calcification points in the area is not smaller than the count threshold value.

An abnormal shadow detecting system in accordance with another embodiment of the present invention will be described, hereinbelow. As the first embodiment shown in FIG. 1, the abnormal shadow detecting system of this embodiment comprises a prospective micro calcification point extracting means 10 which extracts prospective micro calcification points in an original image on the basis of original image data P input, for instance, from an image read-out apparatus, and a cluster area setting means 20 which clusters the extracted prospective micro calcification points to set cluster areas (the areas in which the micro calcification exists). In this embodiment, the cluster area setting means 20 sets benignant cluster areas and malignant cluster areas separately from each other.

When original image data P representing a radiation image of a breast is input into the prospective micro calcification point extracting means 10, the prospective micro calcification point extracting means 10 extracts prospective micro calcification points (prospective micro calcification shadows) in the radiation image by a morphology filter processing and creates a micro structure image (a prospective micro calcification image) Cs2 including therein only the prospective micro calcification points. At this time, the prospective micro calcification point extracting means 10 sets larger the threshold values T1 and T2 in the morphology filter processing so that the micro structure image Cs2 includes substantially no noise.

Image data representing the micro structure image Cs2 is input into the cluster area setting means 20. The cluster area setting means 20 sets a plurality of circular areas as in the first embodiment on the basis of the image data representing the micro structure image Cs2 and obtains the count (number) of the prospective micro calcification points included in each of the circular areas. The cluster area setting means 20 corrects the count for each circular area on the basis of fluctuation in size and density of the prospective micro calcification points in the area. The counts may be corrected in the same manner as in the first embodiment using the same threshold values and correction values described above in conjunction with correction of the count of the prospective micro calcification points in each of the circular areas though the threshold values, the correction values and the like may be variously determined according to the micro calcification shadows to be detected.

The cluster area setting means 20 extracts areas, where the corrected count is 5 or more, as malignant detected areas, and sets each interconnected area where one or more malignant detected areas are continuous as a malignant cluster area. Further, the cluster area setting means 20 extracts areas, where the corrected count is less than 5, as benignant detected areas, and sets each interconnected area where one or more benignant detected areas are continuous as a benignant cluster area.

Figure 3:
FIG. 3 is a view showing the structure of an abnormal shadow detecting system in accordance with another embodiment of the present invention.
Figure 4A:
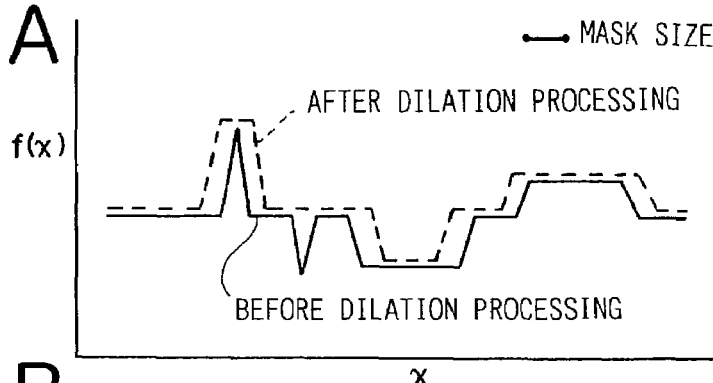
FIGS. 4A to 4D are views for illustrating the morphology operation.
Figure 4B:
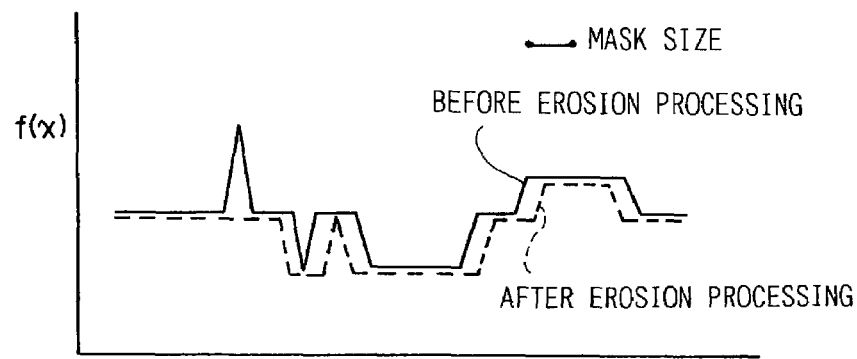
Figure 4C:
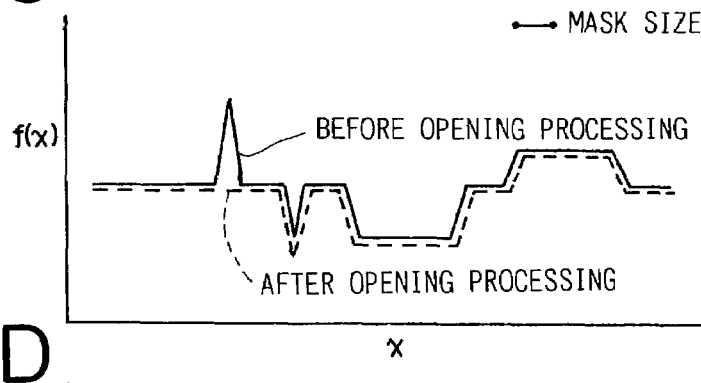
Figure 4D:
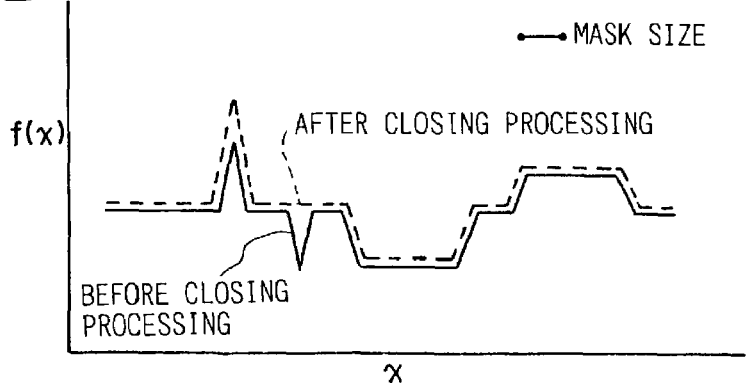
Figure 5:
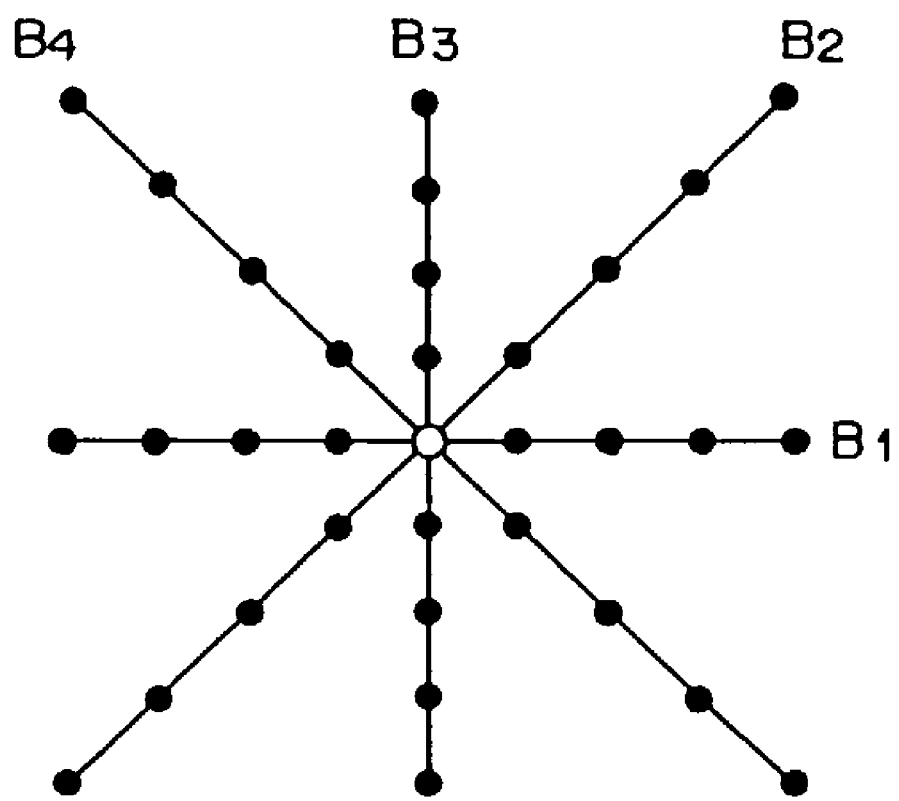
FIG. 5 is a view for illustrating four linear structural elements B employed in the morphology operation.

Though, in the abnormal shadow detecting system of the second embodiment, the cluster area setting means 20 sets benignant cluster areas and malignant cluster areas separately from each other, a malignancy discriminating means 40 may be provided as shown in FIG. 3 so that the cluster area setting means 20 sets a plurality of circular areas, each of which has its center on one of the extracted prospective micro calcification points and is 51 pixels (5.1 mm) in its radius, on the basis of the image data representing the micro structure image Cs2 input from the prospective micro calcification point extracting means 10 and sets each interconnected area where one or more circular areas including therein at least a predetermined number of prospective micro calcification points are continuous as a cluster area, and the malignancy discriminating means 40 receives position data representing the position of each cluster area and the image data representing the micro structure image Cs2 from the cluster area setting means 40 and discriminates whether the cluster area is of malignant micro calcification or benignant micro calcification on the basis of the fluctuation in size and/or the fluctuation in density of the prospective micro calcification points in the area. For example, the prospective micro calcification points included in each of the cluster areas are counted and the count is corrected on the basis of the fluctuation in size and/or the fluctuation in density of the prospective micro calcification points in the cluster area. Then each cluster area is determined to be of malignant micro calcification when the corrected counted for the cluster area is not smaller than a predetermined threshold value and each cluster area is determined to be of benignant micro calcification when the corrected counted for the cluster area is smaller than the predetermined threshold value.

When the cluster areas set by the cluster area setting means 20 in the second embodiment may be output from a CRT or a printer in different colors by their attributes (whether it is of benignant micro calcification or malignant micro calcification). Further, it is possible to display only cluster areas of an attribute selected by the reader.

Though, in the embodiments described above, the count of prospective micro calcification points in each area is corrected on the basis of both the fluctuation in size and the fluctuation in density of the prospective micro calcification points in the area, the count may be corrected on the basis of one of the fluctuation in size and the fluctuation in density of the prospective micro calcification points in the area according to the tendency described above with reference to FIG. 2.

What is claimed is:

1. An abnormal shadow detecting system comprising a prospective micro calcification point extracting means which extracts prospective micro calcification points in a radiation image of an object on the basis of image data representing the radiation image, and a cluster area setting means which clusters the extracted prospective micro calcification points to set cluster areas, wherein the cluster area setting means:
    sets a plurality of areas in a radiation image;
    obtains at least one of fluctuation in size and fluctuation in density of prospective micro calcification points in each of the areas;
    extracts detected areas from the plurality of areas on the basis of at least one of fluctuation in size and fluctuation in density of the prospective micro calcification points in each of the areas; and
    sets each interconnected area where a predetermined number of or more extracted detected areas are continuous as a cluster area.

2. An abnormal shadow detecting system as defined in claim 1 in which the cluster area setting means is arranged to obtain a count of the prospective micro calcification points in each of the areas,
    correct the obtained count on the basis of at least one of fluctuation in size and the fluctuation in density of the prospective micro calcification points in the area and extracts areas where the corrected count is not smaller than a predetermined threshold value as the detected areas.

3. An abnormal shadow detecting system as defined in claim 1 in which the cluster area setting means is arranged to obtain a count of the prospective micro calcification points in each of the areas; and
    to extract an area as a detected area when the count of the prospective micro calcification points in the area is not smaller than a predetermined threshold value which is determined area by area on the basis of at least one of fluctuation in size and fluctuation in density of the prospective micro calcification points in the area.

4. An abnormal shadow detecting system comprising a prospective micro calcification point extracting means which extracts prospective micro calcification points in a radiation image of an object on the basis of image data representing the radiation image, and a cluster area setting means which clusters the extracted prospective micro calcification points to set cluster areas, wherein the cluster area setting means:
    sets a plurality of areas in the radiation image;
    obtains at least one of fluctuation in size and fluctuation in density of the prospective micro calcification points in each of the areas;
    extracts at least one of benignant detected areas and malignant detected area from the plurality of areas on the basis of at least one of fluctuation in size and fluctuation in density of the prospective micro calcification points in each of the areas; and
    sets each interconnected area where a predetermined number of or more benignant extracted detected areas are continuous as a benignant cluster area and each interconnected area where a predetermined number of or more malignant extracted detected areas are continuous as a malignant cluster area.

5. An abnormal shadow detecting system as defined in claim 4 in which the cluster area setting means is arranged to:
    obtain a count of the prospective micro calcification points in each of the areas;
    correct the obtained count on the basis of at least one of the fluctuation in size and the fluctuation in density of the prospective micro calcification points in the area; and
    extract areas where the corrected count is not smaller than a first predetermined threshold value as the malignant detected areas.

6. An abnormal shadow detecting system as defined in claim 4 in which the cluster area setting means is arranged to:
    obtain a count of the prospective micro calcification points in each of the areas;
    correct the obtained count on the basis of at least one of the fluctuation in size and the fluctuation in density of the prospective micro calcification points in the area; and
    extract areas where the corrected count is smaller than a second predetermined threshold value as the benignant detected areas.

7. An abnormal shadow detecting system as defined in claim 4 in which the cluster area setting means is arranged to:
    obtain a count of the prospective micro calcification points in each of the areas; and
    extract an area as the malignant detected area when the count of the prospective micro calcification points in the area is not smaller than a first predetermined threshold value which is determined area by area on the basis of at least one of the fluctuation in size and the fluctuation in density of the prospective micro calcification points in the area.

8. An abnormal shadow detecting system as defined in claim 4 in which the cluster area setting means is arranged to:
    obtain a count of the prospective micro calcification points in each of the areas; and
    extract an area as the benignant detected area when the count of the prospective micro calcification points in the area is smaller than a second predetermined threshold value which is determined area by area on the basis of at least one of the fluctuation in size and the fluctuation in density of the prospective micro calcification points in the area.

9. An abnormal shadow detecting system comprising a prospective micro calcification point extracting means which extracts prospective micro calcification points in a radiation image of an object on the basis of image data representing the radiation image, and a cluster area setting means which clusters the extracted prospective micro calcification points to set cluster areas, the system comprising:
    a malignancy discriminating means which obtains at least one of fluctuation in size and fluctuation in density of the prospective micro calcification points in each of the cluster areas and discriminate whether the cluster area is of malignant micro calcification or benignant micro calcification on the basis of at least one of the fluctuation in size and the fluctuation in density of the prospective micro calcification points in the area.

10. An abnormal shadow detecting system comprising a cluster area setting means arranged to:
    obtain a count of prospective micro calcification points in each of a plurality of areas in a radiation image;

correct the obtained count based on at least one of fluctuation in size of the prospective micro calcification points in each of the plurality of areas and fluctuation in density of the prospective micro calcification points in each of the plurality of areas; and extract areas where the corrected count is not smaller than a predetermined threshold value for determining detected areas.

11. The abnormal shadow detecting system of claim 10, wherein the extracted areas are malignant detected areas.

12. The abnormal shadow detecting system of claim 11 wherein the cluster area setting means is further arranged to extract an area as a benignant detected area when the count of the prospective micro calcification points in the area is smaller than a second predetermined threshold value determined area by area based on at least one of fluctuation in size of the prospective micro calcification points in the area and fluctuation in density of the prospective micro calcification points in the area.

13. The abnormal shadow detecting system of claim 10, wherein the cluster area setting means is further arranged to extract areas where the corrected count is smaller than a second predetermined threshold value as benignant detected areas.

14. An abnormal shadow detecting system comprising a cluster area setting means arranged to:
    obtain a count of prospective micro calcification points in each of a plurality of areas in a radiation image; and
    extract an area as a detected area when the count of the prospective micro calcification points in the area is not smaller than a predetermined threshold value determined area by area based on at least one of fluctuation in size of the prospective micro calcification points in the area and fluctuation in density of the prospective micro calcification points in the area.

15. The abnormal shadow detecting system of claim 11 wherein the extracted area is extracted as a malignant detected area when the count of the prospective micro calcification points in the area is not smaller than a first predetermined threshold value.

16. An abnormal shadow detecting system comprising a prospective micro calcification point extracting means which extracts prospective micro calcification points in a single radiation image of an object on the basis of image data representing the single radiation image, and a cluster area setting means which clusters the extracted prospective micro calcification points to set cluster areas, wherein the cluster area setting means:
    sets a plurality of areas in a single radiation image;
    obtains at least one of fluctuation in size and fluctuation in density of prospective micro calcification points in each of the areas;
    extracts detected areas from the plurality of areas on the basis of at least one of fluctuation in size and fluctuation in density of the prospective micro calcification points in each of the areas; and
    sets each interconnected area where a predetermined number of or more extracted detected areas are continuous as a cluster area.

17. The system of claim 16, wherein the extracted detected areas are spatially continuous.

18. An abnormal shadow detecting system comprising a prospective micro calcification point extracting means which extracts prospective micro calcification points in a single radiation image of an object on the basis of image data representing the single radiation image, and a cluster area setting means which clusters the extracted prospective micro calcification points to set cluster areas, wherein the cluster area setting means:
    sets a plurality of areas in a single radiation image;
    obtains fluctuation in size of prospective micro calcification points in each of the areas;
    extracts detected areas from the plurality of areas based on the fluctuation in size of the prospective micro calcification points in each of the areas; and
    sets each interconnected area where a predetermined number of or more extracted detected areas are continuous as a cluster area.

19. The system of claim 18, wherein the extracted detected areas are spatially continuous.

* * * * *